United States Patent
Aquino et al.

(10) Patent No.: US 9,862,109 B2
(45) Date of Patent: Jan. 9, 2018

(54) METHOD OF CUTTING TUBULAR MEMBERS AND APPARATUS THEREFOR

(71) Applicant: Federal-Mogul Powertrain, Inc., Southfield, MI (US)

(72) Inventors: Luis Aquino, El Paso, TX (US); Jesus Arenivar, El Paso, TX (US); Samuel Barron, El Paso, TX (US); Jose De La Cruz, Fabens, TX (US); Arthur Fong, El Paso, TX (US); Steve Warneke, El Paso, TX (US)

(73) Assignee: Federal-Mogul Powertrain LLC, Southfield, MI (US)

( * ) Notice: Subject to any disclaimer, the term of this patent is extended or adjusted under 35 U.S.C. 154(b) by 730 days.

(21) Appl. No.: 13/644,781

(22) Filed: Oct. 4, 2012

(65) Prior Publication Data
US 2014/0096656 A1    Apr. 10, 2014

(51) Int. Cl.
| | | |
|---|---|---|
| *B26D 3/16* | (2006.01) | |
| *B26D 7/10* | (2006.01) | |
| *B26D 1/10* | (2006.01) | |
| *B26D 1/04* | (2006.01) | |
| *B26D 5/08* | (2006.01) | |
| *B26F 3/08* | (2006.01) | |

(Continued)

(52) U.S. Cl.
CPC ............... *B26D 1/04* (2013.01); *B26D 3/16* (2013.01); *B26D 3/162* (2013.01); *B26D 5/08* (2013.01); *B26D 7/10* (2013.01); *B26F 3/08* (2013.01); *B23D 49/02* (2013.01); *B23D 57/0007* (2013.01); *Y10T 83/0596* (2015.04); *Y10T 83/293* (2015.04); *Y10T 83/869* (2015.04)

(58) Field of Classification Search
CPC . B26D 1/04; B26D 3/162; B26D 7/10; B23D 49/02; B23D 21/00; B23D 5/04
USPC ... 83/54, 523, 171, 388, 319, 376, 460, 555, 83/310, 377, 383, 385, 390, 776, 563, 83/636, 647, 554, 574
See application file for complete search history.

(56) References Cited

U.S. PATENT DOCUMENTS 1,611,965 A  * 12/1926  Von Glahn ..................... 83/226
2,415,824 A     6/1943  Katz et al.
(Continued)

FOREIGN PATENT DOCUMENTS

| EP | 2436468 A1 | 4/2012 |
| FR | 2738579 | 9/1996 |
| WO | WO03/105298 | 12/2003 |

OTHER PUBLICATIONS

International Search Report dated Jan. 21, 2014 (PCT/US2013/062827).

*Primary Examiner* — Ghassem Alie
(74) *Attorney, Agent, or Firm* — Robert L. Stearns; Dickinson Wright, PLLC

(57) ABSTRACT

A method and apparatus for cutting a polymeric tubular member is provided. The method includes moving the polymeric tubular member along a central longitudinal axis into a position to be cut and providing a cutting blade operably connected to an actuator. The method further includes actuating the actuator to move the cutting blade conjointly along a straight linear axis. Then, bringing a cutting region of the cutting blade into cutting engagement with the polymeric tubular member, with the cutting region engaging the polymeric tubular member extending over a length of the cutting blade that is greater than a diameter of the polymeric tubular member.

11 Claims, 2 Drawing Sheets

(51) Int. Cl.
  *B23D 49/02* (2006.01)
  *B23D 57/00* (2006.01)

(56) References Cited

U.S. PATENT DOCUMENTS

| | | | |
|---|---|---|---|
| 2,438,156 A * | 3/1948 | Dodge | 428/95 |
| 2,685,901 A * | 8/1954 | Putzer | 83/870 |
| 2,781,839 A * | 2/1957 | Bockrath et al. | 83/171 |
| 3,015,143 A * | 1/1962 | Lindbloom | 83/619 |
| 3,692,889 A | 9/1972 | Hetrich | |
| 4,051,650 A | 10/1977 | Gleyze et al. | |
| 4,430,852 A | 2/1984 | Hatcher | |
| 4,945,648 A | 8/1990 | Roth et al. | |
| 4,951,538 A * | 8/1990 | Borzym | 83/388 |
| 5,191,824 A * | 3/1993 | Rathbun, Jr. | 83/874 |
| 5,217,562 A | 6/1993 | Macchiarnio et al. | |
| 5,255,619 A | 10/1993 | Brunelli et al. | |
| 5,267,670 A * | 12/1993 | Foster | 222/1 |
| 5,518,575 A * | 5/1996 | Watanabe | 156/494 |
| 5,666,872 A * | 9/1997 | McDonald et al. | 83/871 |
| 6,430,912 B2 | 8/2002 | Lenz et al. | |
| 6,631,609 B2 | 10/2003 | Scheunemann | |
| 6,675,684 B2 * | 1/2004 | Chezzi et al. | 83/319 |
| 6,705,070 B2 | 3/2004 | Schwartz | |
| 6,742,424 B2 * | 6/2004 | Fukuta et al. | 83/13 |
| 6,817,604 B2 | 11/2004 | Ohlmann et al. | |
| 7,108,716 B2 * | 9/2006 | Burnside et al. | 623/1.38 |
| 7,591,299 B1 | 9/2009 | Gordon et al. | |
| 2007/0095043 A1 | 5/2007 | Puaux | |
| 2007/0166495 A1 | 7/2007 | Sellis et al. | |
| 2011/0083879 A1 | 4/2011 | Avula et al. | |

* cited by examiner

METHOD OF CUTTING TUBULAR MEMBERS AND APPARATUS THEREFOR

BACKGROUND OF THE INVENTION

1. Technical Field

This invention relates generally to methods and apparatus for cutting tubular members, and more particularly to methods and apparatus for cutting polymeric tubular members.

2. Related Art

Polymeric tubular members, such as textile polymeric tubular members, are known to be cut widthwise to a predetermined length, as desired. As shown in FIGS. 1A and 1B, a textile tubular sleeve 1 containing polymeric yarn, is commonly fed lengthwise in a direction 2 parallel to a central longitudinal axis 3 until a desire length L to be cut extends beyond a cutting blade 4. Then, the cutting blade 4, which is oriented to extend along its longitudinal axis 5 such that a leading cutting edge 6 is perpendicular to the central longitudinal axis 3, is moved along a straight linear path 7 perpendicular to the central longitudinal axis 3 and longitudinal axis 5. The cutting blade 4 can further be heated, which is known to facilitate making a clean cut through the polymeric yarn of the sleeve 1. Given the relative orientations of the sleeve 1, the blade 4, and their respective directions 2, 7 of movement, as shown in FIG. 1B, a region 8 of the blade 4 that cuts through the sleeve 1 is limited to a width 8 of the blade 4 corresponding to a diameter D of the sleeve 1, such that W=D. As such, although the blade 4 may initially perform clean cuts, generally free of end fray, over extended use during a cutting operation, the cutting edge 6 in the region 8 becomes dull and the heat generated within the region 8 becomes cooled. This results due to the relatively narrow region 8 being used to perform the cutting over a repeated cutting cycle. Further yet, as can be seen in FIG. 1B, with the orientation of the cutting edge 6 being as shown and described, the cutting edge 6 makes initial cutting contact with a leading apex A1 of the tubular sleeve 1 and progresses through the full width of the sleeve 1 until it exits lastly the trailing apex A2 of the sleeve 1. Accordingly, the cutting motion of the cutting edge 6 is one of pure compression. The dulling, cooling, and pure compressive cutting motion of the cutting blade 4 all result in a less than desirable cut, particularly when combined with one another. Accordingly, it typically becomes necessary to slow the cutting process to a less than optimal rate, and further requires changing the cutting blade 4 frequently, and in many cases, 2 or 3 times over an 8 hour shift.

SUMMARY OF THE INVENTION

In accordance with one aspect of the invention, a method of cutting a polymeric tubular member is provided. The method includes moving the polymeric tubular member along a central longitudinal axis into a position to be cut and providing a cutting blade operably connected to an actuator. Further, actuating the actuator to move the cutting blade conjointly along a straight linear axis. Then, bringing a cutting region of the cutting blade into cutting engagement with the polymeric tubular member, with the cutting region, engaging the polymeric tubular member, extending over a length of the cutting blade that is greater than a diameter of the polymeric tubular member.

In accordance with a further aspect of the invention, the method includes providing the cutting region to extend about 2 times the distance of the diameter of the polymeric tubular member.

In accordance with a further aspect of the invention, the method includes orienting a cutting edge of the cutting blade in oblique relation to the straight liner axis.

In accordance with a further aspect of the invention, the method includes making initial cutting contact with the cutting blade against the polymeric tubular member in circumferentially spaced relation from an apex of the polymeric tubular member.

In accordance with a further aspect of the invention, an apparatus for cutting a polymeric tubular member is provided. The apparatus includes an actuator moveable along a straight linear axis and an elongate cutting blade operably connected to the actuator for conjoint movement with the actuator along the straight linear axis. Further, the elongate cutting blade has a cutting edge extending in oblique relation to the straight liner axis.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1A:
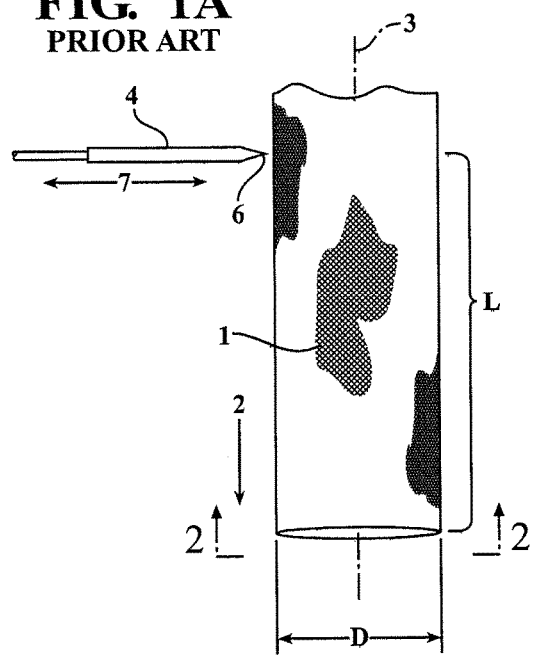
FIG. 1A is a schematic side view of an apparatus for cutting a polymeric tubular member in accordance with the prior art.
Figure 1B:
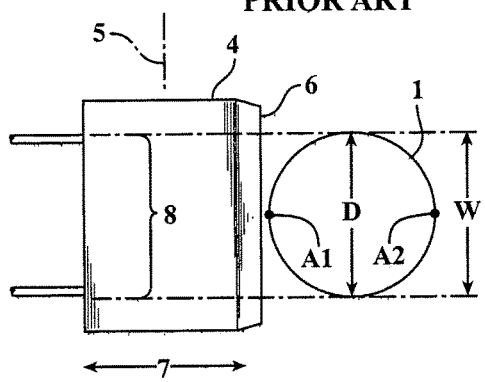
FIG. 1B is a schematic plan view taken generally along line 1B-1B of FIG. 1A.
Figure 2:
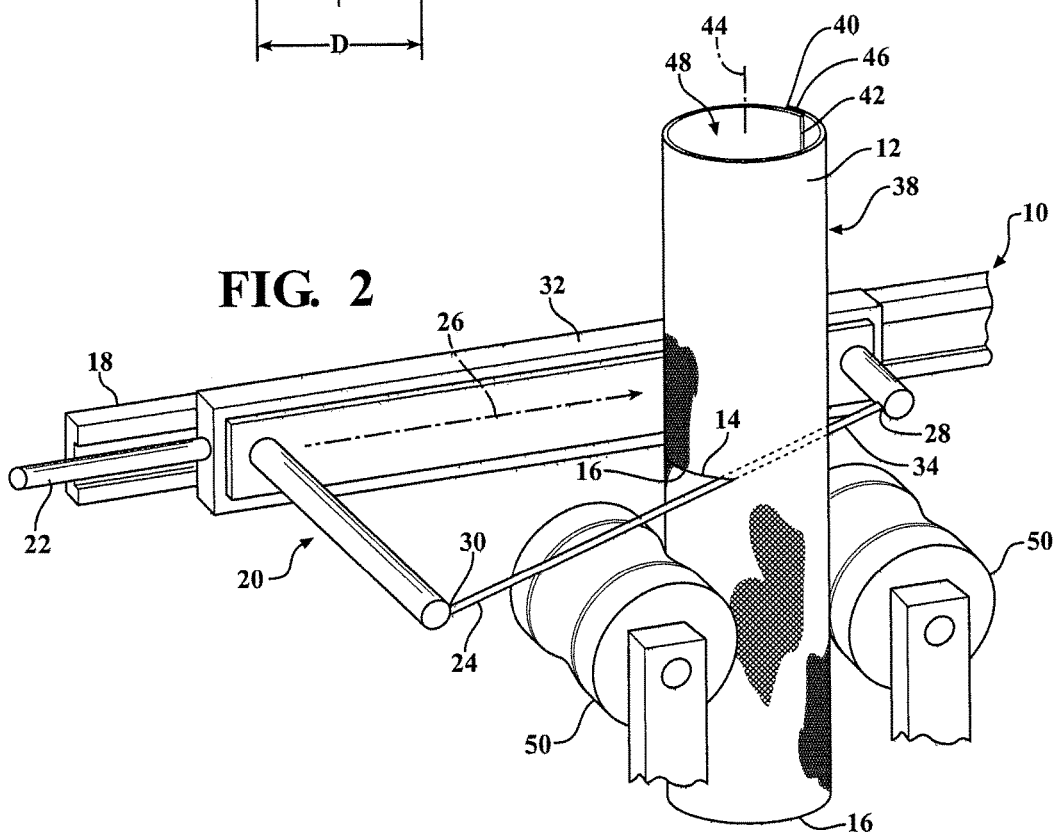
FIG. 2 is a perspective view of an apparatus for cutting a polymeric tubular member in accordance with one aspect of the invention.

Referring in more detail to the drawings, FIG. 2 illustrates a cutting apparatus, referred to hereafter as apparatus 10, for cutting a polymeric tubular member, such as a tubular textile sleeve 12 containing polymeric yarn, in accordance with one aspect of the invention. The apparatus 10 cuts the sleeve 12 in a quick and efficient manner, such that the ends 14, 16 of the sleeve 12 are cut cleanly, thereby being free of end fray. Accordingly, the sleeve 12 takes on a pleasing aesthetic appearance and exhibits a long and useful life, with a greatly diminished chance of becoming damaged due to end fray. Further, the sleeve 12 is economical in manufacture, thereby resulting increased rates of production without jeopardizing the quality of the end product.

The apparatus 10 includes a straight linear slide rail 18 along which a cutting assembly 20 traverses. To advance the cutting assembly 20 along the slide rail 18, an actuator 22 is operably connected to the cutting assembly 10. The actuator 22 can be provided as any suitable linear actuator, including, but not limited to, screw-type actuators, hydraulic actuators, pneumatic actuators, solenoid-type actuators, and the like, as are known in the art of establishing linear actuation. The actuator 22 and cutting assembly 20 are shown in FIG. 2 in a fully retracted, non-cutting position, and FIGS. 3A-3D show a sequential cutting progression with a cutting blade 24, sometimes referred to as cutting wire, being advanced along a straight linear axis 26 through the sleeve 12 to cut the length of sleeve 12 desired.

Figure 3A:
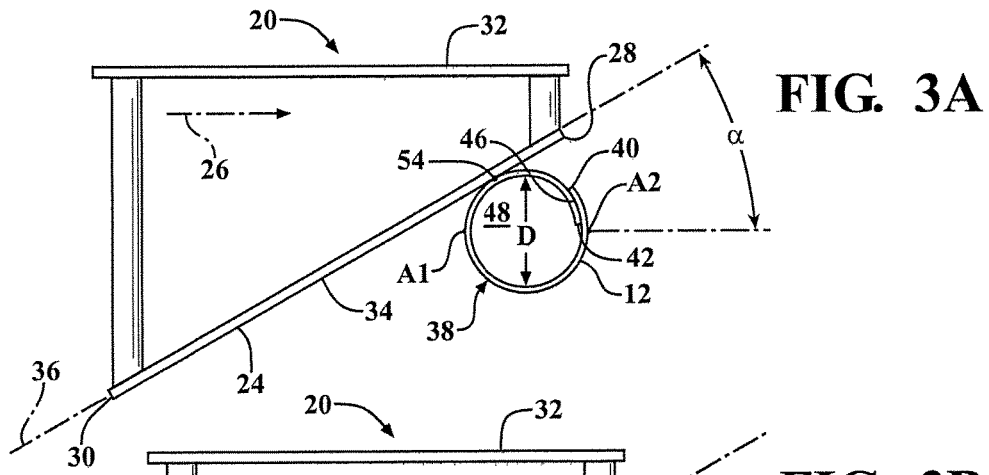
FIGS. 3A-3D are sequential plan views of a cutting blade of the apparatus of FIG. 2 in various cutting positions as the cutting blade cuts through the polymeric tubular member.
Figure 3B:
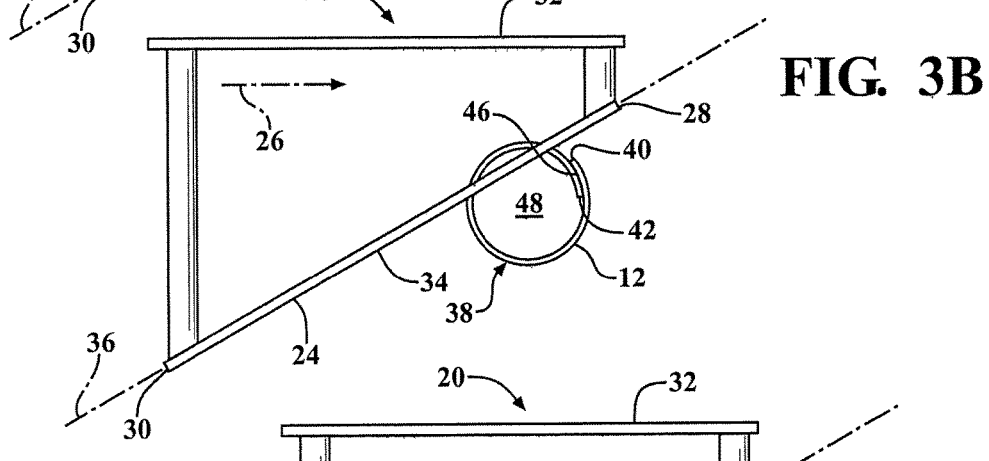
Figure 3C:
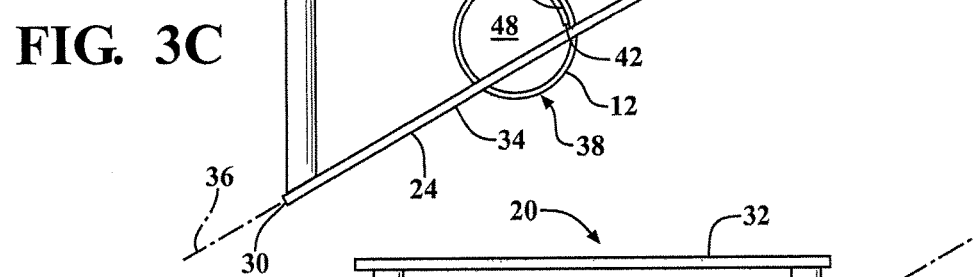
Figure 3D:
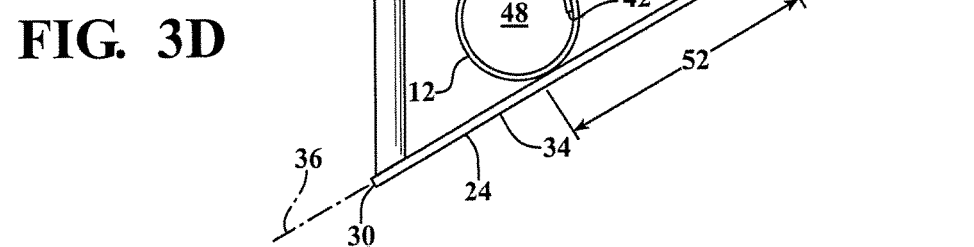

The cutting blade 24 is fixed adjacent its opposite ends 28, 30 to a support member 32 of the cutting assembly 20. The support member 32 is operably attached to the actuator 22 for conjoint movement therewith along the slide rail 18 and along the straight linear axis 26. The cutting blade 24 has a leading cutting edge 34 that extends along an axis 36 that is oblique to the straight linear axis 26. As shown in FIGS. 2 and 3A, the angle of oblique inclination α of the cutting edge axis 36 and the axis 26 is generally between about 15 and 60 degrees, and in more narrow constraints, between about 30 and 45 degrees. To facilitate cutting through the polymeric material of the sleeve 12, and to promote forming a clean, end fray free cut, the cutting blade is heated via a suitable connection to a source of electricity/heat (not shown).

The textile sleeve 12 has a wall 38 that can be constructed having any suitable size, including length (determined by the cutting process), diameter and wall thickness. The wall 38, shown as an open wall construction, has opposite edges 40, 42 extending generally parallel to a central longitudinal axis 44 that terminate at the open opposite ends 14, 16. When the wall 38 is in its self-wrapped tubular configuration, generally free from any externally applied forces, the edges 40, 42 can overlap one another at least slightly to form a seam 46 and fully enclose a central cavity 48 circumferentially, and thus, the wall 38 provides enhanced protection to the elongate members, such as a wire harness (not shown), contained in the cavity 48 upon installation of the sleeve 10 in use. The edges 40, 42 are readily extendable away from one another under an externally applied force to at least partially open and expose the cavity 48. Accordingly, the elongate member can be readily disposed into the cavity 48 during assembly or removed from the cavity 48 during service. Upon releasing the externally applied force, the edges 40, 42 return automatically under a bias imparted from being heat set to their relaxed, overlapping self-wrapped position.

The wall 38 can be constructed from multifilament and/or monofilament yarns, with at least one or more of the yarns being provided as a heat-settable polymeric yarn. For example, one or more of the yarns can be provided as a heat-settable polymeric material, such as polyphenylene sulfide (PPS), for example, which can be heat set at a temperature of about 200-225 degrees Celsius. The wall 38 can be woven, knit, or braided, from the yarn, as desired.

During the cutting operation, the material of the wall 38, having already been heat-set into its self-wrapping configuration, is fed vertically along its central longitudinal axis 44 about an arbor so that a predetermined length (this is the finish length of the sleeve 10 upon being cut to length) of the wall 38 extends beyond the cutting blade 24, while the cutting blade is in its fully retracted position. Then, the wall 38 is clamped between a pair of driven rollers 50 beneath the cutting blade 24 to hold the free end 14 of the sleeve 12 to maintain the wall 38 in a fixed position for cutting purposes. Then, the heated cutting blade 24 is advance via actuation of the actuator 22 to perform the cutting. With the axis 36 of the cutting blade 24 being fixed in oblique relation to the central longitudinal axis 44 and inclined at the angle α relative to the direction or axis 26 of linear cutting blade travel, a cutting region 52 of the cutting blade 24 is brought into cutting engagement with the tubular sleeve wall 38, wherein the cutting region 52 extends over an axial length of the cutting blade 24 that is greater than a diameter D of the tubular wall 38. Accordingly, the axial length of the cutting blade 24 that is responsible for cutting the wall 38 to length is greater than the diameter D of the wall. This allows an increased axial length of the cutting blade 24 and cutting edge 34 to be used during each cutting cycle, which in turn allows the cutting edge 34 to retain its sharpness for an increased number of cutting cycles, and further, it allows the cutting blade 24 to maintain an elevated temperature throughout each cutting cycle, thereby maximizing the ability to perform a clean, end fray free cut. Then, upon being cut to length, the length of cut wall 38 is fed by the driven rollers 50 to a hopper (not shown), whereupon a new cutting cycle is performed.

The length of the cutting region 52 is ultimately determined by the angle of inclination α. The smaller the angle of inclination α, the greater the axial length of the cutting region 52. By way of example, where the angle of inclination α is 30 degrees, the axial length of the cutting region 52 is 2 times the diameter D of the wall 38. Accordingly, in contrast to the prior art, wherein only an axial length of cutting blade equal to the diameter D of the wall is used, twice as much cutting blade is now used.

In accordance with another benefit of the invention, with the cutting edge 34 being inclined at the angle α, as discussed above, the wall 38 is cut in a sawing-type or sliding cut fashion, rather than being clamped or chopped under pure compression. This is demonstrated by the fact that, when the tubular wall 38 is brought into cutting position, as shown in FIG. 3A, the tubular wall 38 has diametrically opposite leading and trailing apexes A1, A2 aligned along the straight linear axis 26 of cutting blade travel, the cutting edge 34 makes initial cutting contact against a side region 54 of the tubular wall 38 that is circumferentially spaced from the leading and trailing apexes A1, A2. Then, as the cutting edge 34 continues to slice through the wall 38, the cutting edge then cuts firstly through the leading apex A1 and thereafter through the trailing apex A2, and then finally, through a remaining side region 56 of the wall 38 spaced circumferentially from the apexes A1, A2. Accordingly, both apexes A1, A2 are sliced prior to completing the full cutting of the wall 38, and thus, the cutting motion of the cutting blade 24 takes on a lateral slicing motion directed from the side region 54 of the wall 38 toward the opposite side region 56 of the wall 38, rather than a pure compression motion directed from the leading apex A1 toward the trailing apex A2. As such, a clean, end fray free cut is reliably performed over an extended useful life of the cutting blade 24.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A method of cutting a textile sleeve containing polymeric yarn, comprising:
moving the textile sleeve along a central longitudinal axis into a position to be cut;
providing a heated cutting blade operably connected to an actuator;
actuating the actuator to move the cutting blade conjointly and solely along a straight linear axis; and
bringing a cutting region of the cutting blade into direct cutting engagement with the textile sleeve, wherein the cutting region brought into direct cutting engagement with the textile sleeve is about 2 times greater in length than a diameter of the textile sleeve.

2. The method of claim 1 further including orienting a cutting edge of the cutting blade in oblique relation to the straight liner axis.

3. The method of claim 2 further including orienting the cutting edge to extend between 15 and 30 degrees relative to the straight linear axis.

4. The method of claim 2 further including orienting the cutting edge to extend between 30 and 45 degrees relative to the straight linear axis.

5. The method of claim 1 further including orienting the straight linear axis of cutting blade travel in substantially perpendicular relation to the central longitudinal axis of the textile sleeve.

6. The method of claim 5 wherein the textile sleeve has diametrically opposite apexes aligned along the straight linear axis of cutting blade travel, and further including making initial cutting contact with the cutting blade against the textile sleeve in circumferentially spaced relation from the apexes.

7. The method of claim 1 further including clamping the textile sleeve while the cutting blade is in cutting engagement with the textile sleeve.

8. The method of claim 1 further including providing the textile sleeve having a circumferentially discontinuous wall with an open seam extending substantially parallel to the central longitudinal axis.

9. An apparatus for cutting a tubular textile sleeve containing polymeric yarn, comprising:
   an actuator moveable over a full stroke along a straight linear axis;
   an elongate, heated cutting blade operably connected to said actuator for conjoint movement solely under the influence of said actuator solely along said straight linear axis; and
   said elongate cutting blade having a cutting edge extending in oblique relation to said straight liner axis, said cutting edge having a cutting region that is brought into direct cutting contact with the tubular sleeve over the full stroke of said actuator, said cutting region being about 2 times greater in length than a diameter of the tubular textile sleeve.

10. The apparatus of claim 9 wherein said cutting edge extends between 15 and 30 degrees relative to said straight linear axis.

11. The apparatus of claim 10 wherein said cutting edge extends between 30 and 45 degrees relative to the straight linear axis.

* * * * *

UNITED STATES PATENT AND TRADEMARK OFFICE
CERTIFICATE OF CORRECTION

| | | |
|---|---|---|
| PATENT NO. | : 9,862,109 B2 | |
| APPLICATION NO. | : 13/644781 | |
| DATED | : January 9, 2018 | |
| INVENTOR(S) | : Luis Aquino et al. | |

It is certified that error appears in the above-identified patent and that said Letters Patent is hereby corrected as shown below:

Column 3 Line 8 Remove "a" and insert --α--

Signed and Sealed this
Tenth Day of April, 2018

Andrei Iancu
*Director of the United States Patent and Trademark Office*